United States Patent
Strom et al.

(10) Patent No.: US 6,531,084 B1
(45) Date of Patent: *Mar. 11, 2003

(54) LASER EDGE TREATMENT OF SLIDERS

(75) Inventors: Richard Albert Strom, Eagan, MN (US); Mohamed-Salah Houceine Khlif, Fridley, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/566,412

(22) Filed: May 8, 2000

(51) Int. Cl.$^7$ .................. B23K 26/38; G11B 5/127
(52) U.S. Cl. .................. 264/400; 264/230; 264/482; 219/121.69; 219/121.66; 219/121.72; 29/603.12; 29/603.15; 29/603.16; 29/603.18; 29/898.13
(58) Field of Search ................. 264/400, 482, 264/319, 230; 219/121.65, 121.66, 121.68, 121.69, 121.67, 121.76, 121.85, 121.72; 29/603.15, 603.18, 603.12, 603.16

(56) References Cited

U.S. PATENT DOCUMENTS

| | | | | | |
|---|---|---|---|---|---|
| 5,266,769 | A | * | 11/1993 | Deshpande et al. | 219/121.69 |
| 5,982,583 | A | * | 11/1999 | Strom | 360/103 |
| 6,073,337 | A | * | 6/2000 | Strom | 29/603.12 |
| 6,108,170 | A | * | 8/2000 | Crawforth et al. | 360/234.3 |
| 6,255,621 | B1 | * | 7/2001 | Lundquist et al. | 219/121.72 |

* cited by examiner

*Primary Examiner*—Stefan Staicovici

(57) ABSTRACT

A method for laser edge treating (LET) a slider and a slider with laser edge treatment, wherein the laser treatment is used to modify the curvature along the air-bearing surface, including altering a slider edge ridge that forms at the edges of the air bearing surface due to compressive stresses induced in the air bearing surface by a prior lapping step. The laser makes positive and negative adjustments to crown, cross curve, and twist as measured on the air bearing surface by selectively altering the treatment pattern or the treatment location on the slider's side edges.

29 Claims, 10 Drawing Sheets

LASER EDGE TREATMENT OF SLIDERS

BACKGROUND

The present invention relates generally to data storage systems. More particularly the present invention relates to a method of laser edge treating of sliders during manufacture.

Magnetic disc drives are information storage devices that use thin film magnetic media to store data. A typical disc drive includes one or more rotating rigid discs having concentric data tracks wherein data is read or written. The discs are mounted on a spindle motor that causes the discs to spin and the surfaces of the discs to pass under respective head gimbal assemblies. As the disc rotates, a transducer (or "head") is positioned by an actuator to magnetically read data from or write data to the various tracks on the disc. A head gimbal assembly can carry the transducer, which writes information to or reads information from a disc surface.

Typically, an actuator mechanism controlled by electronic circuitry moves the head gimbal amongst the tracks of the disc. The actuator mechanism can include a track accessing arm and a load beam for each head gimbal assembly. As a disc rotates at operating speeds, hydrodynamic pressure effects caused by air flow between the surface of the disc and an air bearing surface of the head cause the head to float above the disc. Once a predetermined rotational speed and head fly height (i.e., float height) is reached, reading and/or writing of data may commence. Maintaining proper fly height is essential to the accurate and reliable operation of the disc drive. The head gimbal assembly can include an air bearing slider and a gimbal. The gimbal can be positioned between the slider and a load beam thereby providing a resilient connection that allows the slider to pitch and roll while following the topography of the disc.

Typically, a slider includes a slider body having an air bearing surface that faces the disc surface. As the disc rotates, air is forced under the slider along the air bearing surface in a direction approximately parallel to the tangential velocity of the disc. Friction on the air bearing surface causes the air pressure between the disc and the air bearing surface to increase. This air pressure creates a hydrodynamic lifting force that causes the slider to lift and fly above the disc surface. A pre-load force applied by the load beam is used to counteract and control the hydrodynamic lifting force. The point at which the pre-load force and the hydrodynamic lifting force reach equilibrium determines the flying height of the slider.

A transducer is typically mounted at or near the trailing edge of the slider. Flying height is viewed as one of the most critical parameters of contact and non-contact recording. As the average flying height of a slider decreases, the transducer achieves greater resolution between individual data bit locations on a disc. Consequently, it is desirable to have the transducers fly as close to the disc as possible. Flying height is preferably uniform regardless of variable flying conditions, such as tangential velocity variation from inside to outside tracks, lateral slider movement during seek operations and air bearing skew angles.

In certain applications, it is desirable to fabricate the slider such that the bearing surface has a positive curvature along the length and width of the slider. Length curvature is known as crown curvature. Width curvature is known as camber or cross curvature. The proper setting and control of length and width curvature improves flying height variability over varying conditions, improves wear on the slider and the disc surface, and improves takeoff performance by reducing stiction between the slider and the disc surface.

During slider fabrication, length or width curvature is resultant to lapping the bearing surface. Lapping is typically performed on a spherically-shaped lapping surface or on a flat lapping surface while rocking the slider body back and forth in the direction of a desired curvature. On the latter, the radius of the rocking rotation can determine the amount of curvature. Known lapping processes can be difficult to control resulting in varying amounts of curvature. In addition, in typical slider processing compressive machining stresses are left on the edges of the thin film head slider following a dicing operation. Since the air bearing surface curvature has initially been determined at the bar level prior to dicing, these slider edge stresses alter the flatness and leave unwanted slider ridges (or abrupt increases in cross curve near the rail edges).

Various methods of providing tensile stress to the back surface of a slider body have been used to control the curvature of the body. U.S. Pat. No. 5,982,583 discloses melting and then cooling the back surface of a slider to add tensile stress and, thereby inducing curvature of the bearing surface. A laser beam is scanned across the back surface of a slider body to induce this melt condition. Other techniques include altering stresses from the back of a slider through the use of a micro sandblast tool or laser to pattern the back of the slider. Patterns can be chosen to modify camber and/or crown curvature. Camber and crown modification can take place while the sliders are still in a row, or after separation into individual sliders.

However, decreasing fly heights and continued miniaturization requires still more control over slider curvature. More efficient and controllable methods of affecting air bearing surface curvatures are desirable.

The details of one or more embodiments of the invention are set forth in the accompanying drawings and the description below. Features, objects and advantages of the invention will be apparent from the description and drawings, and from the claims.

SUMMARY OF THE INVENTION

The present invention provides a method for Laser Edge Treating (LET) a slider during processing, and a slider with laser edge treatment, wherein the laser treatment is used to modify the curvature of a slider edge. The laser can also be used to alter ridges along the slider edge and to make positive and negative adjustments to the crown and cross curve. LET is effective after slider dismount to precondition the crown and cross curve prior to slider level crown adjustment. The LET can also be applied to a slider edge at the bar assembly level following the dicing operation as a blind batch treatment.

A ridge formed along the dicing edge of a disc head slider can be controlled by applying heat to slider material along a path that follows a dicing path which is used to fabricate the slider. The heat must be sufficient to alter stresses created by the dicing process. As a result of the heating, a reduction, or elimination of an alteration of the curvature along the air bearing surface occurs, which may result in an alteration of the dicing edge ridge. The heat can be applied with a laser or other concentrated heat source.

In one embodiment, the laser is applied to a slider edge. This can be accomplished, for example, by directing the laser into a dicing slit of a wafer bar assembly of slider material.

In addition, the present invention can be utilized to control crown, cross curve, and twist on the slider. Control can be accomplished by varying the pattern used to apply the heat to the slider. Patterns can include, for example, beginning close to an air bearing surface of the slider material and proceeding towards a back surface of the slider material. Another pattern can begin close to a backside surface of the slider material and proceed towards an air bearing surface of the slider material. Another pattern can begin within a middle portion of the slider edge and alternately proceeding outwards towards an air bearing surface and a back surface of the slider material. Still another pattern can be applied to only a portion of the dicing edge, either near the leading edge, or near the trailing edge of the slider to control the twist curvature.

In another aspect of the invention, a disc head slider can include an air bearing surface and a back surface, which is opposite the air bearing surface. A plurality of dicing edges can join the air bearing surface and the back surface. Along a dicing edge a ridge can be reduced or eliminated by thermal relaxation of compressive stress, and by adding tensile stress.

The details of one or more embodiments of the invention are set forth in the accompanying drawings and the description below. Implementations can provide advantages such as higher performance and reliability. Other features, objects, and advantages of the invention will be apparent from the description, the drawings and the claims.

BRIEF DESCRIPTION OF THE DRAWINGS

A specific embodiment of the present invention will be described with reference to the following drawings, wherein.

DETAILED DESCRIPTION OF THE INVENTION

Laser Edge Treatment (LET) can be used to reduce and/or eliminate edge ridges caused by compressive machining stresses resultant of a dicing operation during the manufacture of disc drive sliders. Edge ridges are undesirable as they can result in a catastrophic head-media crash. LET can also be used to influence flatness parameters such as crown and/or cross curve, wherein crown is a measure of the curvature or sag of the rails of a slider in the long axis of the slider (from the trailing edge (TE) to the leading edge (LE)), while cross curve (also known as camber) is a measure of the curvature or sag in the short axis at a 90 degree angle from the long axis. Both crown and cross curve are positive for a convex surface, negative for a concave surface, and zero for a flat surface.

Figure 1:
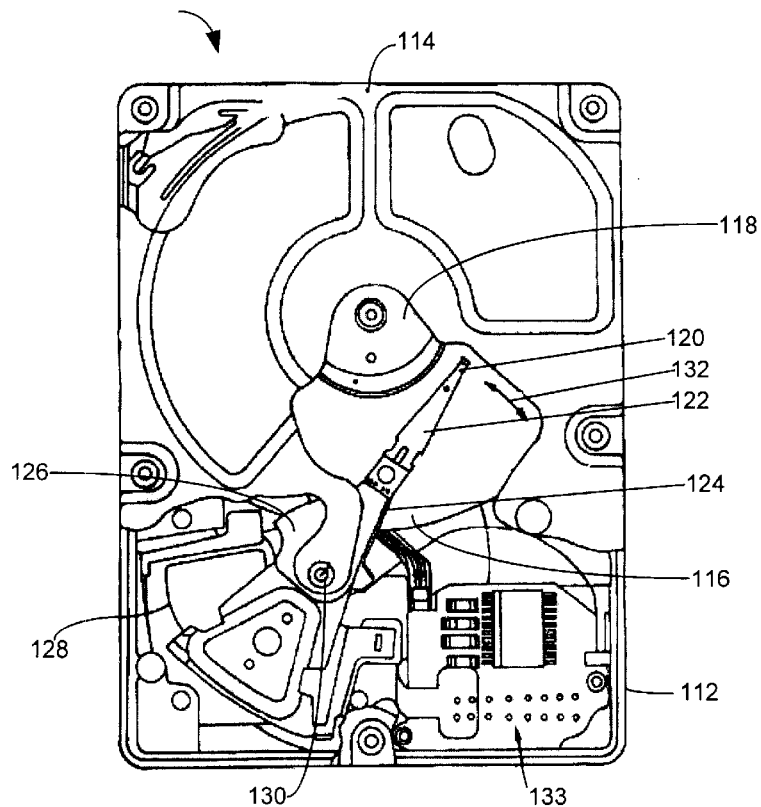
FIG. 1 illustrates a typical disc drive in which a slider according to this invention would be useful.

FIG. 1 is a plan view of a typical disc drive 100 in which a hydrodynamic bearing slider fabricated according to the present invention is used. Disc drive 100 includes a housing with a base 112 and a top cover 114 (portions of top cover 114 are removed for clarity). Disc drive 100 further includes a disc pack 116, which is mounted on a spindle motor (not shown), by a disc clamp 118. Disc pack 116 includes a plurality of individual discs that are mounted for co-rotation about a central axis. Each disc surface has an associated head gimbal assembly (HGA) 120 which is mounted to disc drive 100 for communicating with the disc surface. In the example shown in FIG. 1, HGAs 120 are supported by load beam flexures 122, which are in turn attached to track accessing arms 124 of an actuator 126. The actuator shown in FIG. 1 is of the type known as a rotary moving coil actuator and includes a voice coil motor, shown generally at 128. Voice coil motor 128 rotates actuator 126 with its attached heads 120 about a pivot shaft 130 to position heads 120 over a desired data track along an arcuate path 132 under the control of electronic circuitry 133.

Figure 2:
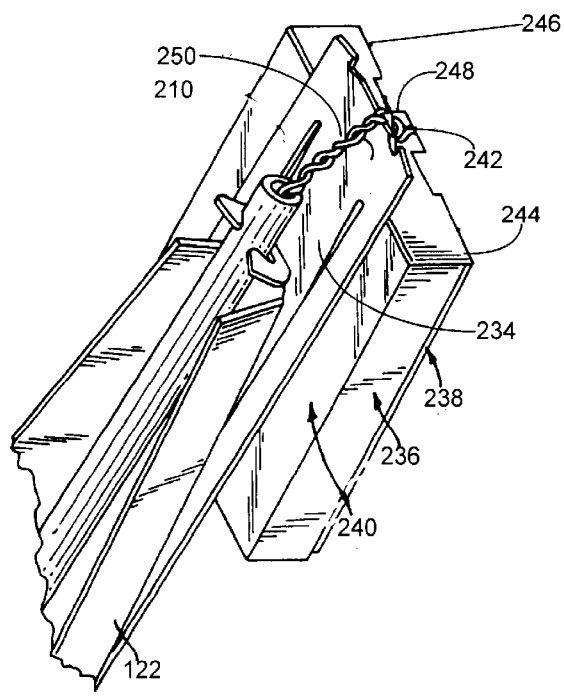
FIG. 2 illustrates a perspective of a gimbal and load beam.

FIG. 2 shows head gimbal assembly 120 in greater detail. Load beam 122 provides a pre-load force, which urges head gimbal assembly 120 toward the disc surface. Assembly 120 includes a gimbal 234 and a slider 236. Gimbal 234 is positioned between slider 236 and load beam 122 to provide a resilient connection that allows the slider to follow the topography of the disc. Slider 236 includes air bearing surface 238, back surface 240 and transducer 242. Air bearing surface (ABS) 238 includes first and second raised side rails 244 and 246 and raised center pad 248. Transducer 242 is fabricated on a trailing end of center pad 248. Transducer 242 is electrically coupled to leads 250. Transducer 242 communicates with individual bit positions on the surface of disc 116 as they pass beneath slider 236. Transducer 242 can include a thin film or a magnetoresistive magnetic head, for example.

Figure 3:
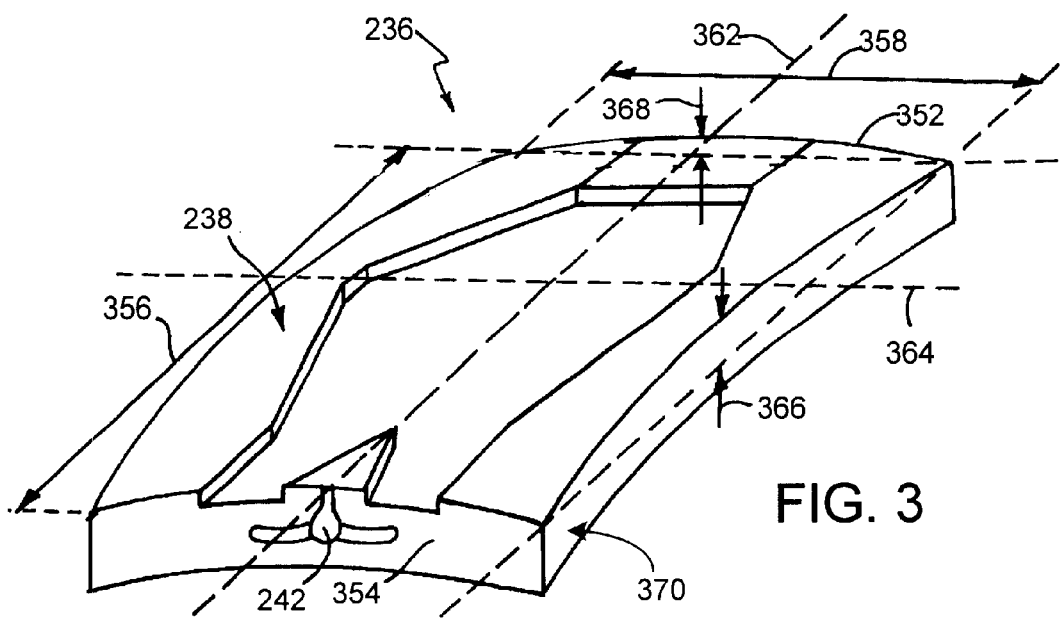
FIG. 3 illustrates a perspective of a slider.

FIG. 3 is a perspective view of slider 236, as viewed from bearing surface 238. Slider 236 has a leading edge (LE) 352, a trailing edge (TE) 354, a length 356 and a width 358. Slider 236 preferably has a positive curvature along crown curvature axis 362 and along cross curvature axis 364. Crown curvature axis 362 extends along length 356 of slider 236, while cross curvature axis extends along width 358 of slider 236. With a positive curvature, air bearing surface 238 has an overall convex shape. A common measurement of the crown curvature along length 356 and the cross curvature along width 358 is the difference between the highest point along the length and width and the lowest point along the length and width, respectively. The height difference along the crown curvature ("crown height") is shown at 366. The height difference along the cross curvature ("cross height") is shown at 368. Typical crown and cross heights can be approximately zero to 1.5 micro inches for a slider having a length of 49 mils and a width of 39 mils. A dicing process used to fashion the slider will create side edges 370 along either side of the slider 236.

Figure 4A:
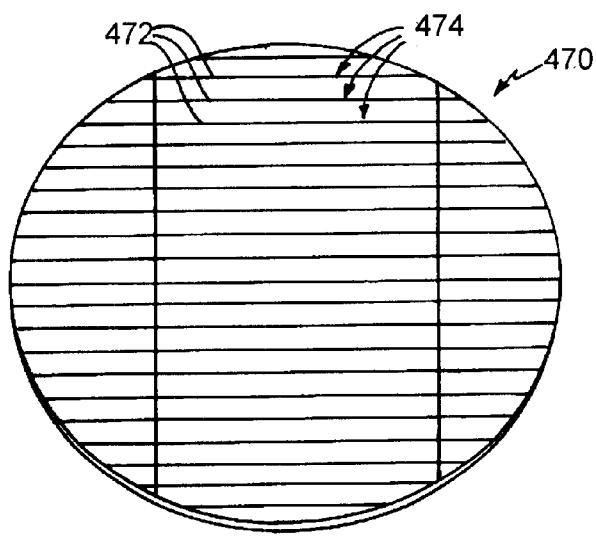
FIG. 4A illustrates a wafer used in the manufacture of a slider body.
Figure 4B:
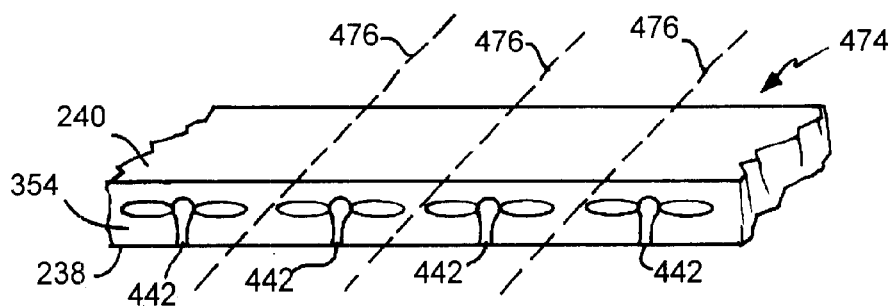
FIG. 4B is a perspective view of a bar sliced from the wafer of FIG. 4A.

Referring now to FIG. 4, a slider body is formed from a substrate known as a wafer. The crown curvature and the cross curvature are formed during fabrication of the slider body. FIG. 4A is a perspective view of a typical wafer 470. A matrix of transducers (not shown) is applied to the top surface of wafer 470. Wafer 470 is then sliced in a pattern of rows 472 to create a plurality of bars 474. Each bar 474 includes a plurality of individual slider bodies, with each slider body having a corresponding transducer 442 as shown in FIG. 4B. The sliced surfaces become bearing surface 238 and back surface 240, while the top surface of wafer 470 becomes trailing surface 354 of each slider body. The slicing process induces non-uniform surface stress in bearing surface 238 and back surface 240 due to plastic deformation of the surfaces. This surface stress is typically compressive.

Once wafer 470 has been sliced into individual bars 474, a lapping process can machine the bearing surface 238 of each bar. The lapping process is controlled to obtain a target throat height for each transducer 442. The throat heights are preferably uniform for each transducer in the bar. However, if the bar is not uniformly flat prior to the lapping process, but includes some waviness, a twist or a bow due to the non-uniform compressive surface stress formed by the slicing process, it is difficult, if not impossible, to control the lapping process to achieve a uniform throat height. Once the bars 474 are lapped flat, each bar 474 is diced along a plurality of dice lanes 476 (shown in FIG. 4B) into the plurality of individual slider bodies. The slicing and dicing operations are typically performed with a diamond-tipped saw blade.

Figure 5:
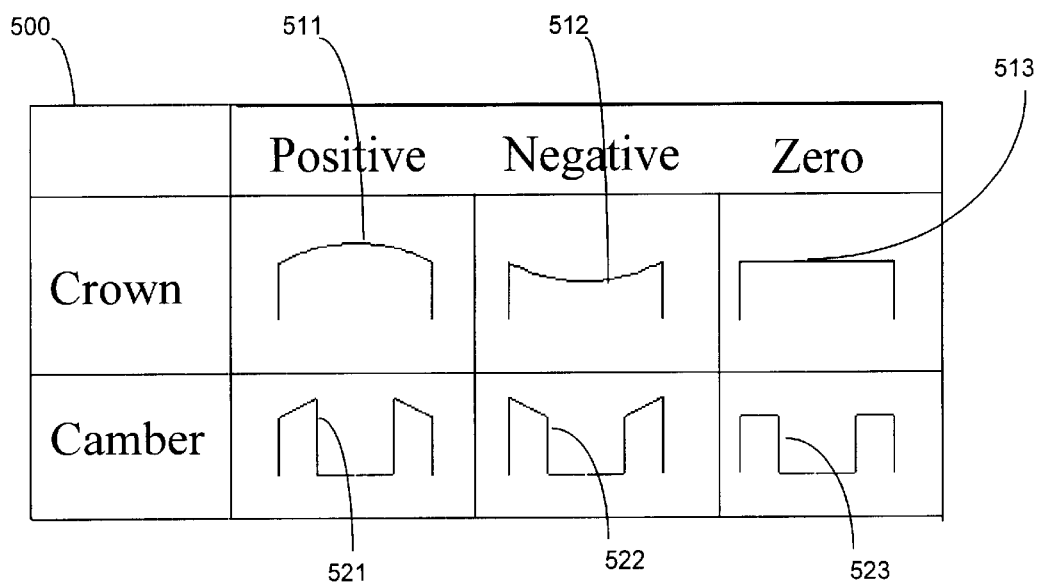
FIG. 5 illustrates different types of crown and camber.

Referring now to FIG. 5, a chart 500 illustrates various types of crown 366 and camber 368 that may be present in the slider rails 244 and 246. A convex rail 511 is considered a positive crown. A concave rail 512 is considered a negative crown. A zero crown 513 has a flat surface. Similarly, with a positive camber 521 the slope rises up, a negative camber 522 has a declining slope, and a zero camber 523 has a flat surface.

Compressive machining stresses are imparted to the edges of the head sliders 236 during the dicing operation. According to this invention, laser edge treatment (LET) relieves compressive stress resultant from the dicing operation and effectively eliminates the edge ridges created as a result of the compressive stresses. The edge ridges can be problematic in that they may result in a catastrophic head media crash. In addition, LET can influence the flatness parameters such as crown and/or cross curve. As discussed above, crown is a measure of the curvature or sag of the rails in the long axis of the slider—i.e., from the TE to the LE—while cross curve, or camber, is a measure of the curvature or sag in the short axis. The camber is at a 90° angle from the long axis.

Figure 6A:
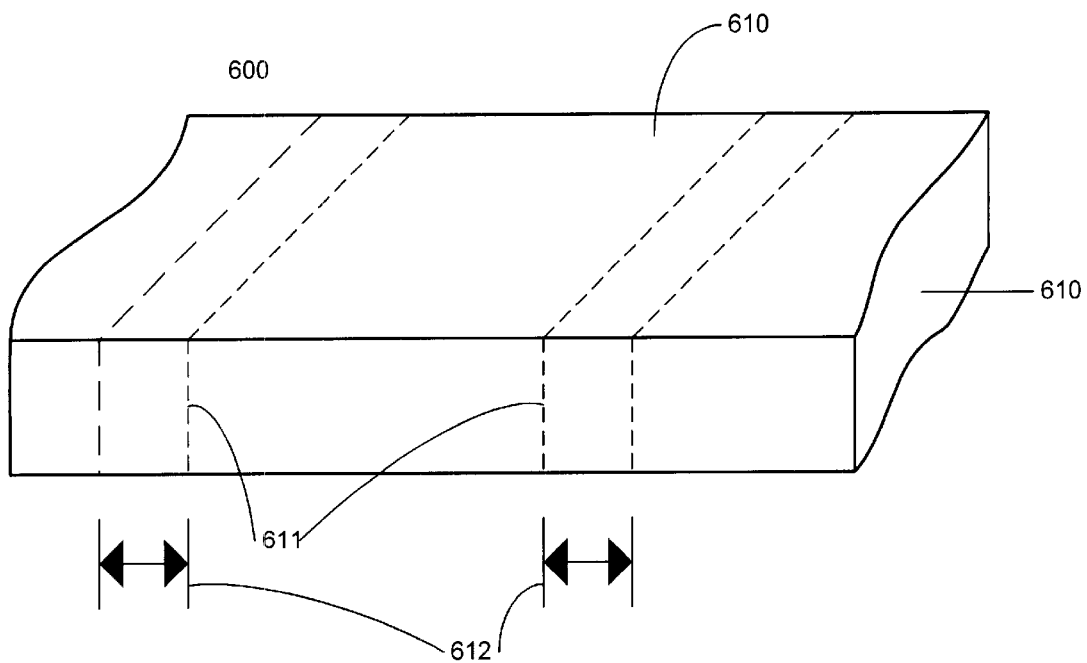
FIG. 6A illustrates a lapped slider bar and dicing lanes prior to dicing.
Figure 6B:
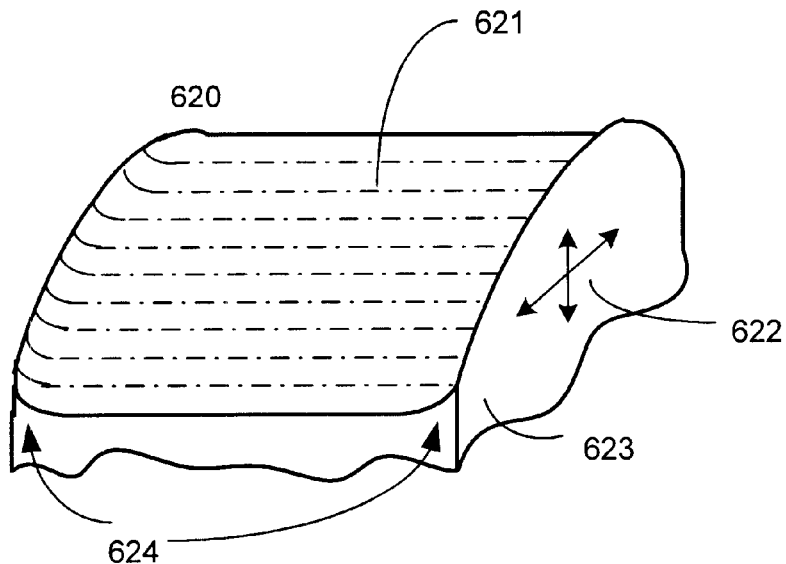
FIG. 6B illustrates a highly magnified view of the lapped surface of the slider body after dicing showing dicing ridges on the slider body's ABS.

Ridges are created during the normal bar level processing for thin film sliders. FIG. 6A shows a bar 600 that has been lapped on the top surface 610. Slider dicing edges 611 are formed by the slider dicing operation where a diamond cutting wheel is used to cut the bar in the areas shown as dice lanes 612. FIG. 6B is a highly magnified view of the lapped (ABS) surface 621 of the slider 620. The dicing operation leaves compressive stresses 622 in the surface material on the edge of the slider 623 as shown by the arrows 622. The dicing compressive stresses 622 expand the material on the slider edge and this results in a raised edge 624 on the top surface closest to the dice cut edge 623. These raised edges 624 are called ridges. The height of a diamond cut dice ridge typically extends about 1.2 μin. above the original lapped air bearing surface 610. The ridge width protrudes into the ABS about 2.0 μm from the edge of the dice cut 623.

Figure 6C:
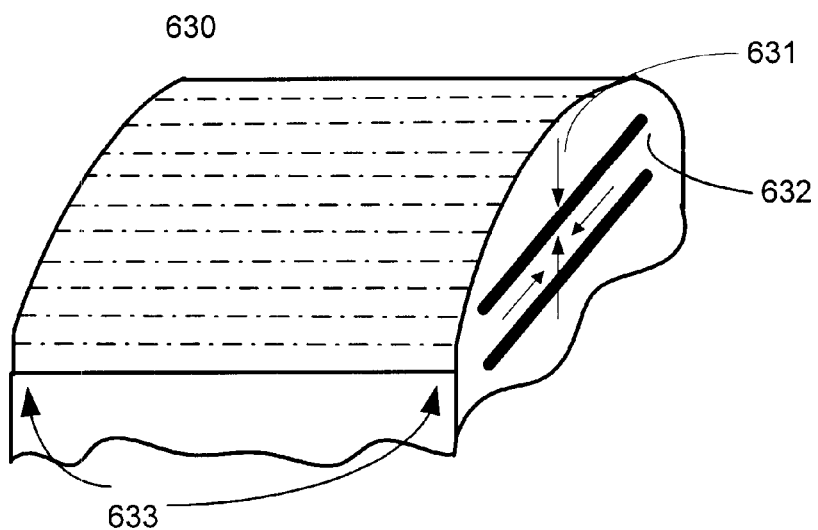
FIG. 6C illustrates diced slider body of FIG. 6B without an ABS ridge after laser treatment of the slider body side edge.

Referring now to FIG. 6C, LET can be applied by scanning a laser beam 632 along the slider dice edge near the top surface (roughly parallel to the length of the ridge). The power density of the laser beam is chosen so that the surface of the slider will be heated so that it melts. When the laser power is removed the surface quickly cools to room temperature and this results in a thermal contraction of the surface material resulting in a tensile stress 631 (as shown by the arrows) left in the surface, which is opposite the original compressive stress 622. Because the laser tensile stress 631 neutralizes the compressive stress 622 from the dice cut, the force that caused the raised edge is removed and the ridge is eliminated 633.

Figure 7:
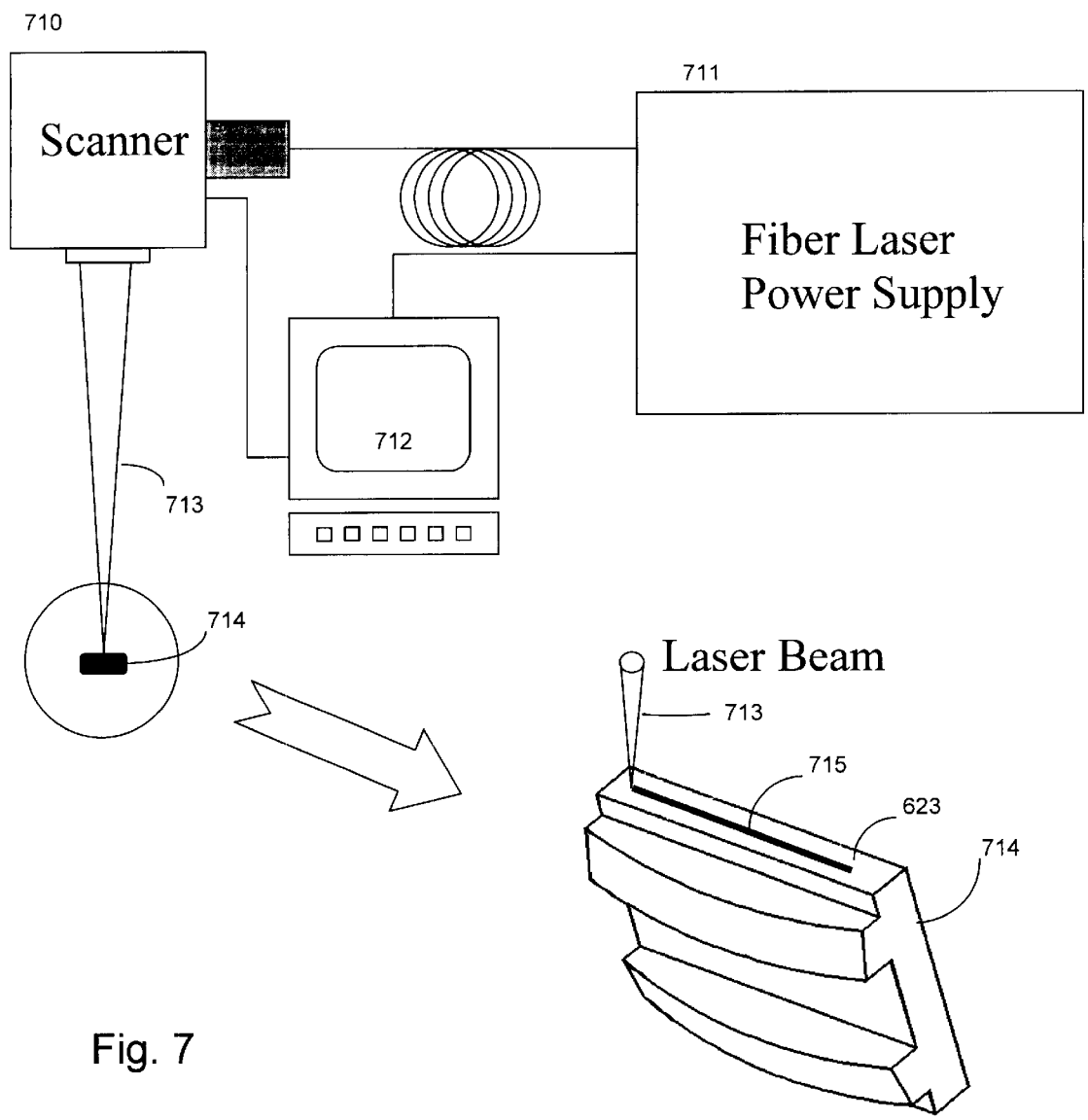
FIG. 7 illustrates a system capable of providing LET treatment.

Referring now to FIG. 7, LET applies heat with a laser beam 713 to a slider 714 in a pattern 715 that follows the dicing edge 623 (or 370) of a slider 714. The LET process utilizes a laser such as a coherent light from a continuous wave (CW) source. A CW laser wavelength is in the infrared region around 1100 nm and can be delivered through a 5 μm optical fiber cable. A beam, up-collimated to a size of about 8 mm, can pass through a two-axis galvanometer, and focus on a slider dicing edge through a flat field lens. The galvanometer system can include a two mirror set that realizes the beam planar motion on the work surface of the slider. The laser beam can symmetrically treat both dicing edges of the slider, with its motion applied in straight lines that run between the TE and the LE of the slider. The TE is the side having the transducer (recording head) and the LE is the side opposite to it. A pulsed laser will also work for stress relieving the edge compressive stresses and eliminating the ridge, but it might not create any significant tensile stress that is useful in altering the over all slider crown and cross curvature. Other laser types may also be effective in this application. A laser that ablates or removes surface material could also be useful in removing the stressed surface material and altering the ridge or slider curvatures. Also, other material removal technologies like ion beam milling could be effective in these applications.

Laser power can be provided by a fiber laser 711. A scanner 710, or galvanometer, can scan a beam using a vector function in a step and repeat mode. For example, the fiber laser power supply 711 can be set to a power setting of 5.5 watts. The beam scanning speed can be set by the scanner 710 at 40 in/sec. The line step, or line to line spacing, can be fixed at 0.6875 mils. The number of lines (N) can be used as a process variable. A band can be defined as a set of lines that will be permanently marked on the working surface. The bandwidth (B) can be defined as the width of the line set. Bandwidth is defined as N−1 times the line step spacing.

Exposure of a dicing edge 623 (or 370) to the laser light causes the slider material to be heated. Other heating sources can be used to heat the slider material, but the heating source should have sufficient power density or energy fluence level to melt the slider material. The heating of the slider material should be sufficient to cause the surface compressive stresses created by the dicing wheel to be altered. As the laser treated material cools, tensile stresses on the non-treated adjacent slider material cause material shrinkage in directions parallel and transverse to the burn lines. Tensile stresses in the direction of scanning can lead to slider curling along the long axis whereby the crown is induced to change. The location of the material shrinkage can determine if the crown change is positive or negative. If the material shrinkage is close to the ABS, the tensile stresses will force the slider to curl up and thus cause a loss in crown value. If scanning occurs over the entire dice edge, crown loss from lines adjacent to the ABS can be balanced by a downward bending from lines adjacent to the slider back surface. Cross curve change can be a result of a combination of factors, including stresses across the scanning direction, the amount of crown change, and whether the change is a loss or a gain.

As discussed further below, five techniques of altering flatness parameters can be achieved with this process. A first technique can include a decrease in crown value with no significant cross curve change. A second technique can include a decrease in crown value accompanied by an increase in cross curve. A third technique can include an increase in crown with no significant cross curve change. The fourth technique can include an increase in crown value accompanied by an increase in cross curve. A fifth technique can include an increase only in the cross curve value.

Figure 8:
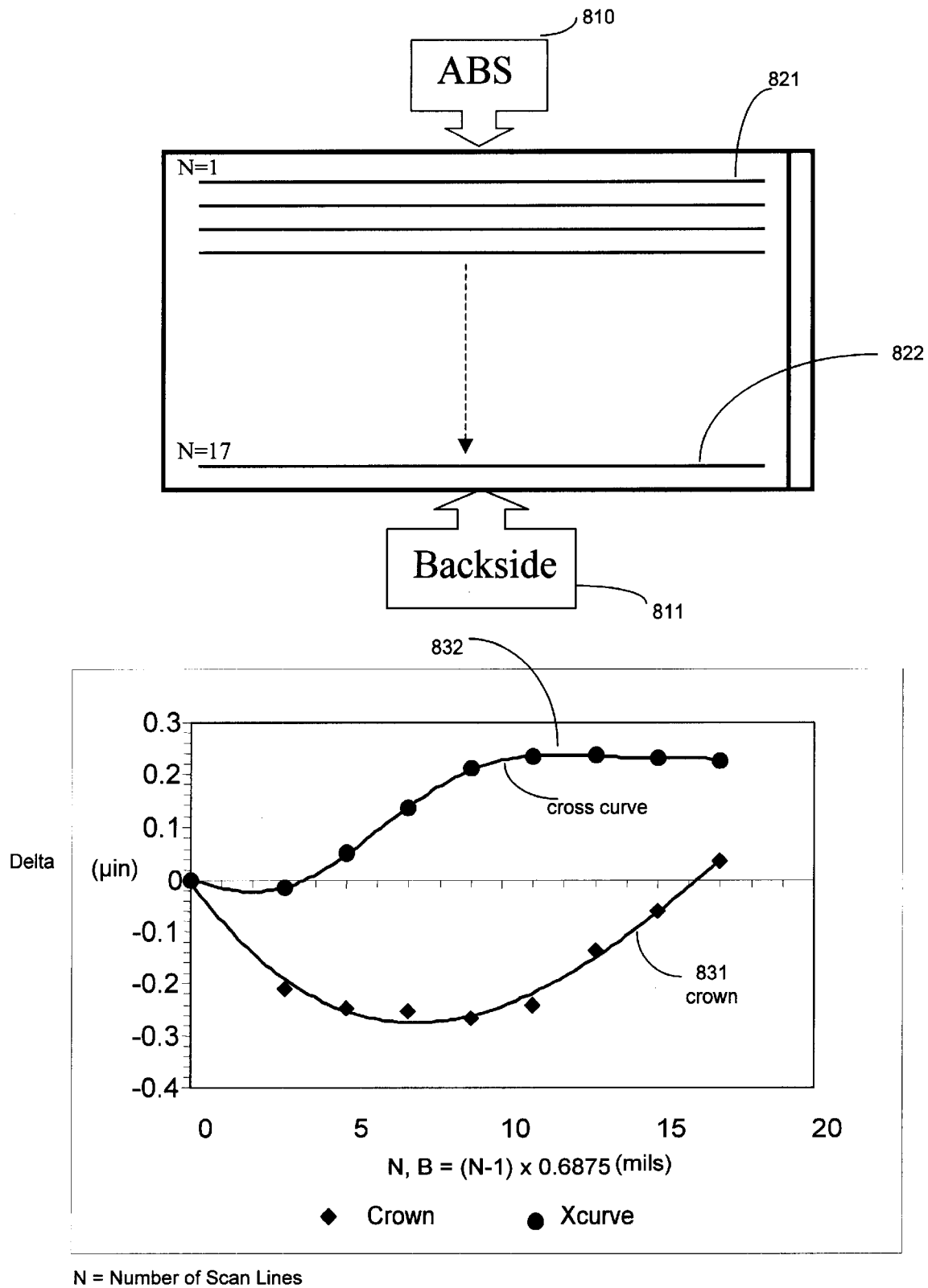
FIG. 8 illustrates a LET pattern beginning near the air bearing surface and proceeding towards the back surface of the slider.
Figure 9:
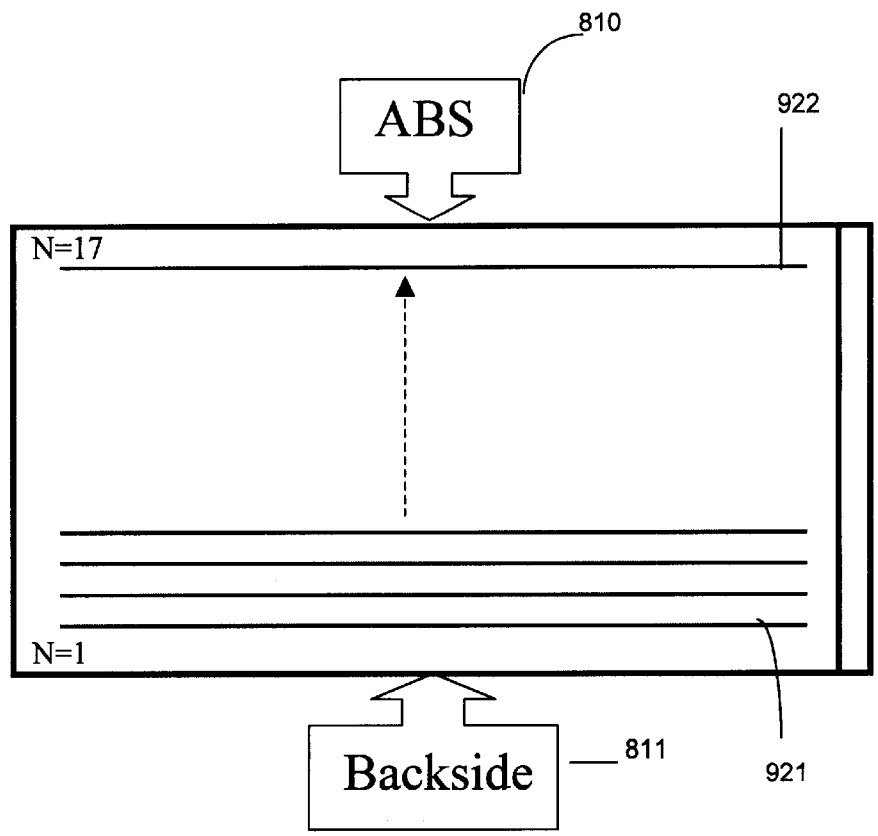
FIG. 9 illustrates a LET pattern beginning near the back surface of the slider and proceeding towards the air bearing surface.
Figure 9:
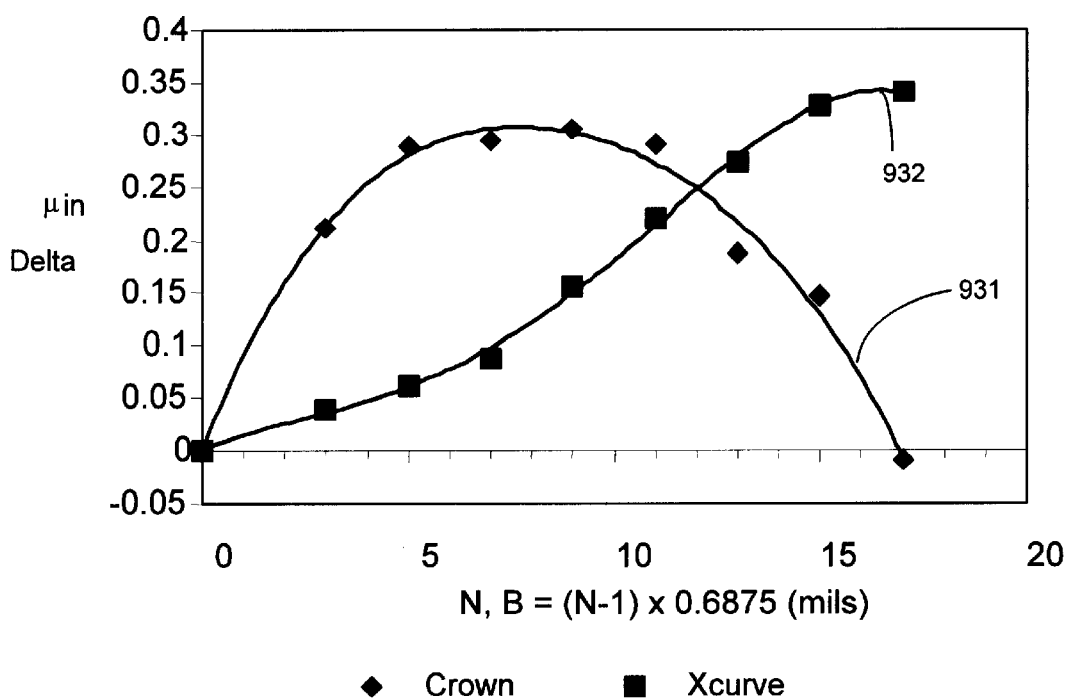
Figure 10:
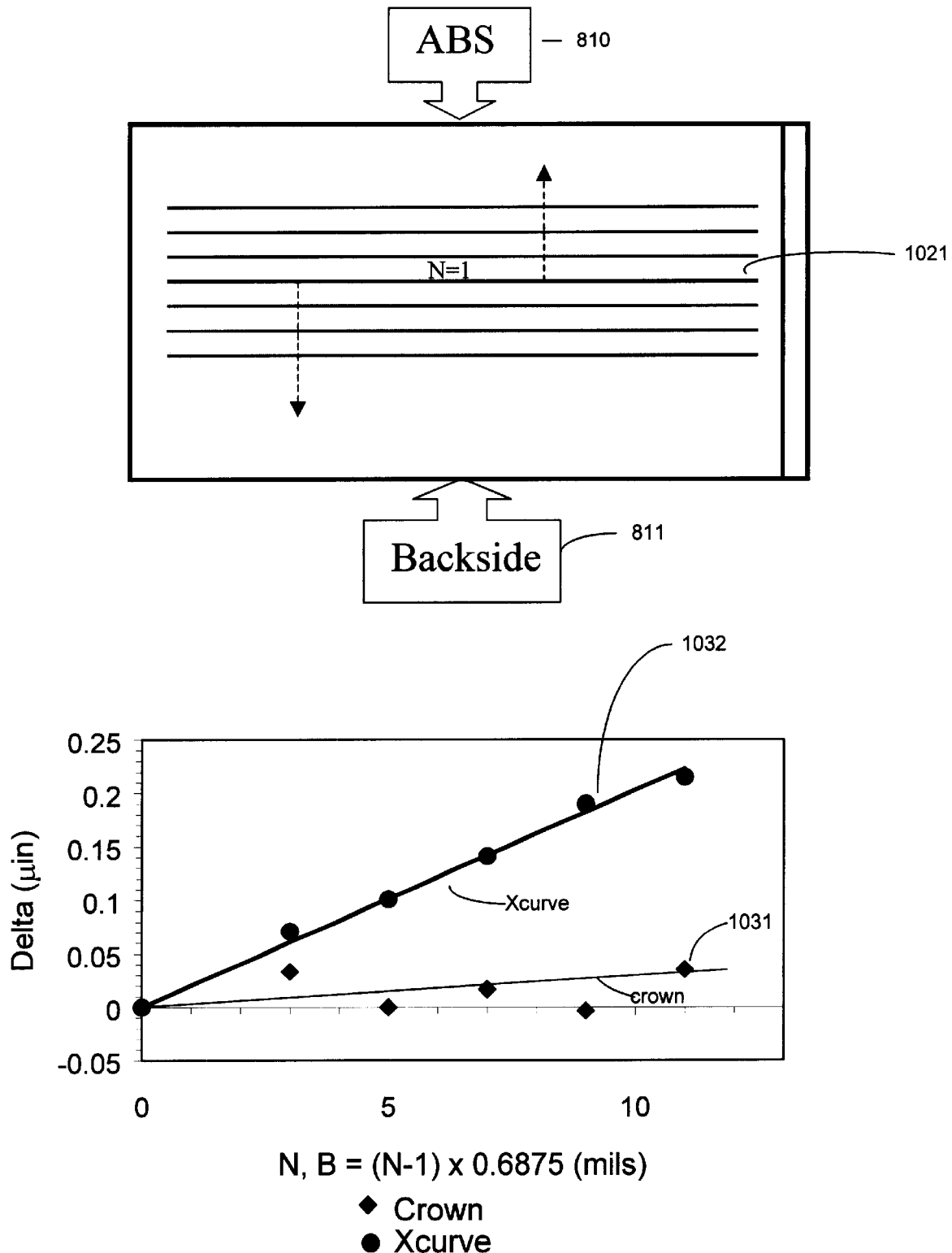
FIG. 10 illustrates a LET pattern beginning near the center of the slider edge and alternately progressing towards the air bearing surface and the back surface.

The graphical results of delta crown and delta cross curve as shown in FIGS. 8, 9, and 10 are the result of applying the same bandwidth (B) pattern and number (N) of tracks or scan lines on both slider dicing edges 611 (or 370) in a symmetrical fashion. The specific data shown in these figures were measured for the time sequential order where the first line was N=1, and the second line was N=2, and so on, for the total number of lines within the bandwidth. Other sequential orders for applying the lines will function similarly and produce satisfactory curvature control, but the specific relationship between crown, and cross curve curvatures may differ from this detail. The important factor for controlling curvature is the total number (N) of lines within a band of bandwidth (B), and the location of the band on the dicing edge in reference to the ABS 810 (FIG. 8), the backside 811 (FIG. 9), or centered near the middle area 1021 (FIG. 10).

Referring now to FIG. 8, in one embodiment, a LET band pattern can be applied to the dicing edges 370 and can begin when N=1 near an ABS 821. For example, the LET band can originate approximately 0.5 mils away from the ABS. The band pattern line sequence can proceed from the ABS to the back surface 811. The pattern may be limited to a bandwidth of 11 mils due to a typical dicing edge 370 being 12 mils wide. Wider dicing edges 370 can accommodate a wider pattern. A final track 822 can be patterned when N is equal to 17, or some other desired number.

The graph of FIG. 8 illustrates the effect of a pattern that grows a bandwidth from the ABS 810 to the back surface 811. In this scenario, a decrease in crown can probably be achieved where N is equal to a low number such as 5. A decrease in crown and an increase in cross curve can occur where N is equal to a higher number, such as N=11. As N was increased, crown decreased while cross curve increased. The slope of the cross curve eventually leveled out as the crown returned to its original value as the scan bandwidth approached its maximum value, at about N=17.

Referring now to FIG. 9, in another embodiment, a bandwidth pattern provides for the LET band to be applied to the dicing edge 370 beginning at the back surface 811 and progressing to the ABS 810. In this pattern, the first track 921 is closest to the back surface 811 and the last track 922 is closest to the air bearing surface 810. The total number of tracks N can be equal to 17 or some other desired number. For example, the first track can be located 0.5 mils from the back surface. The pattern can proceed for a bandwidth of up to about 11 mils, based upon a 12 mil wide dicing edge.

The graph of FIG. 9 illustrates the crown and cross curve resultant from an increasing number of tracks. As shown, an increase in crown can probably be achieved where N is equal to a low number, such as 5. In addition, an increase in crown and an increase in cross curve is resultant of a higher number N, such as N is equal to 11. As N rises above a threshold point, indicated here where N=11, the crown will return back to its original value. Cross curve increased with the bandwidth and reached a maximum value when beam scanning occurred over the full band (N=17).

Referring now to FIG. 10, still another pattern can provide for an LET band to be applied to dicing edges wherein the first pass, N=1, is located in a centric location on the edge, between the ABS 810 and the back surface 811. The LET pattern can alternately progress from the centric position towards the ABS 810 and the back surface 811. As the graph of FIG. 10 illustrates, the crown 1031 and the cross curve 1032 increase on a linear basis when this pattern is followed.

Figure 11A:
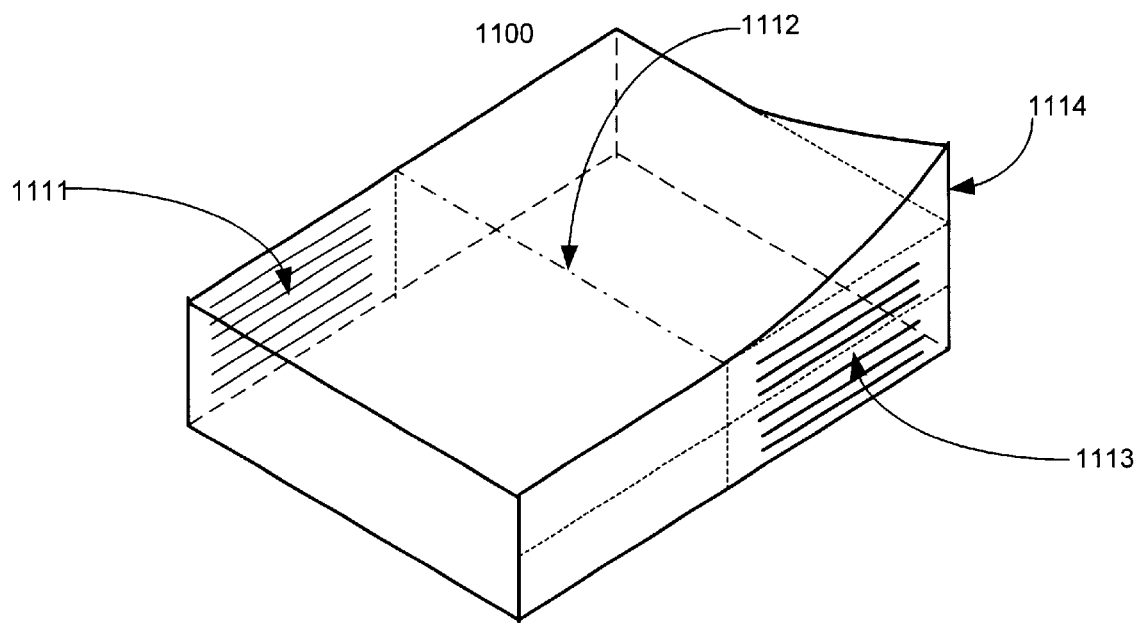
FIG. 11A illustrates a LET pattern used to adjust twist.
Figure 11B:
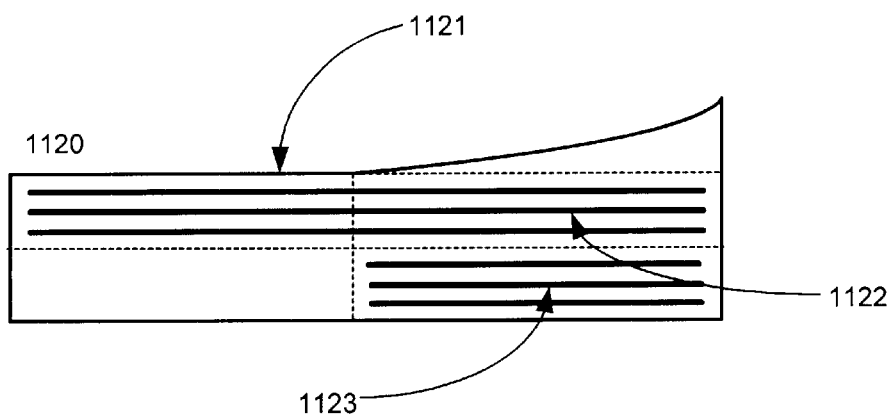
FIG. 11B illustrates a second LET pattern used to remove the ABS dicing ridge and adjust twist.

Twist is defined as an ABS surface curvature shape, where a reference corner of the rectangular ABS is not in the same plane that is defined by the other three corners of the rectangular surface. Now referring to FIG. 11A, the LET treatment on slider edges can also be used to adjust twist. A CW laser applies scanning lines 1113 to add tensile stress, which tends to lower the corner of the slider. If a corner 1114 is higher compared to its neighboring corners on the ABS 1112, then the twist is reduced. To control twist, LET should be applied 1113 to a portion of the edge in which the corner is high 1114. Alternatively, in FIG. 11A, corner 1111 could also be defined as a high corner and the LET could be applied on the other side of the slider or to both corner 1111 and corner 1113. FIG. 11B demonstrates how LET can be used to control both the ridge on the ABS 1121, and to affect twist. By applying LET to only the top laser scan lines 1122, the ridge can be lowered. By applying LET to only the bottom laser scan lines 1123, the twist can be reduced by selectively lowering the corner 1114.

Figure 12:
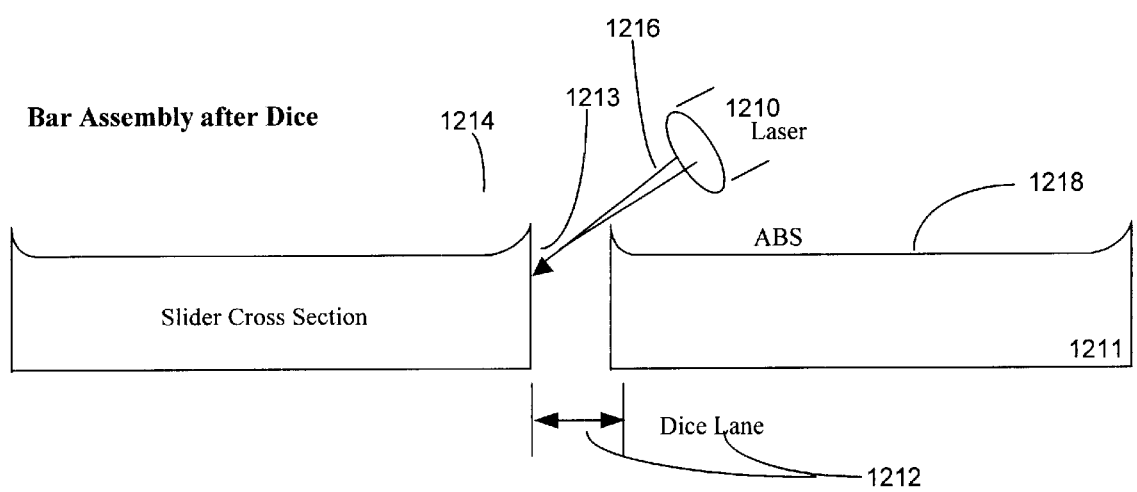
FIG. 12 illustrates an application of LET at an angle to the edge surface.

Referring now to FIG. 12, LET can be applied to a slider edge 1213 as a blind batch treatment to a bar assembly following a dicing operation. The laser 1210 can be directed into the narrow dicing slit 1212 separating adjacent sliders at an angle to the edge of the slider 1213. Typically the laser 1210 can be directed at the slider edge 1213 at an angle of incidence of about 45°. A beam angle of incidence to the dice surface 1213 of greater than 45° would be necessary to treat the lower part of the dice edge 1213. Due to narrow dice width limitation, the upper slider edge nearest to the ABS surface 1218 is typically more easily treated. As the angle of incidence increases, the amount of power that will be absorbed and be successful in causing a surface stress treatment, will decrease.

LET treatment releases compressive stresses introduced by dicing the slider 1211 wherein a dicing ridge 1214 created during a dicing process is removed. A laser 1210 can focus a laser beam 1216 on the dicing cut surface 1213. As discussed above, a pattern of tracks caused by the application of the laser beam 1216 will have various effects on crown and cross curve. In addition, application of the laser beam 1216 to the dicing surface 1213 can eliminate a ridge 1214 caused during dicing. A laser scanned along the dicing edge of the slider tends to remove compressive stress and add tensile stress wherein a reduction in ridge spikes at the edge of the ABS rails occurs. Ridge reduction by LET is best achieved when the laser scan lines along the dice edge 1213 are close to the ABS 1218 within a distance of about 0 to 100 microns.

Although the above embodiments used a diamond-edged dicing wheel as an example of a method to part the slider from the bar, a number of other methods may be used, including ion milling the bar and laser cutting the bar.

A number of embodiments of the present invention have been described. Nevertheless, it will be understood that various modifications may be made without departing from the spirit and scope of the invention. Therefore, other implementations are within the scope of the following claims.

What is claimed is:

1. A method for controlling slider curvatures formed on an air-bearing surface ("ABS") of a disc drive head slider, the slider having a back surface opposite the ABS, and four edge surfaces between the ABS and the back surface, the four edge surfaces comprising a leading edge, a trailing edge and two opposed dicing edge surfaces, the leading and trailing edges being formed when a plurality of bars are sliced from a wafer, and the two dicing edge surfaces being formed by dicing the sliced bars into a plurality of sliders, the dicing operation creating pair of dicing ridges along the intersection of the ABS with the two dicing edge surfaces, the method comprising:

applying heat to a slider material on each of the dicing edges surfaces along a path following a dicing path used to fabricate the slider, wherein the heat is sufficient to alter stresses created by the dicing process.

2. The method of claim 1 wherein the heat is further sufficient to alter compressive stresses created by the dicing process.

3. The method of claim 1 wherein the heat is sufficient to create tensile stress that alters slider curvatures.

4. The method of claim 1 wherein the heat is sufficient to alter the ridge formed along the dicing edge of a disc drive head slider at the intersection of the dicing edge surface with the ABS.

5. The method of claim 1 wherein the heat is applied along a path patterned to control twist.

6. The method of claim 1 wherein the heat is applied with a laser.

7. The method of claim 1 wherein the laser is directed into a dicing slit of a wafer bar assembly of a slider material.

8. The method of claim 1 additionally comprising controlling a crown on the slider with a pattern used to apply the heat following the dicing path.

9. The method of claim 1 additionally comprising controlling a cross curve on the slider with a pattern used to apply the heat following the dicing path.

10. The method of claim 1 wherein the heat following the dicing path is applied to a dicing edge surface in a pattern which begins close to the ABS of the slider and proceeds towards a back surface of the slider.

11. The method of claim 1 wherein the heat following the dicing path is applied to a dicing edge surface in a pattern which begins close to the back surface of the slider and proceeds towards an ABS of the slider.

12. The method of claim 1 wherein the heat following the dicing path is applied to a dicing edge surface in a pattern which begins within a middle portion of the slider dicing edge surface and alternatingly proceeds outwards towards the ABS and the back surface of the slider.

13. A method for controlling a dicing ridge formed along a dicing edge of a disc head slider, the slider having a back surface opposite an air-bearing surface ("ABS"), and four edge surfaces between the ABS and the back surface, the four edge surfaces comprising a leading edge, a trailing edge and two opposed dicing edge surfaces, the leading and trailing edges being formed when a plurality of bars are sliced from a wafer, and the two dicing edge surfaces being formed by dicing the sliced bars into a plurality of sliders, the dicing operation creating a dicing ridge along the intersection of the ABS with a dicing edge surface, the method comprising:

applying a means for altering stresses to the dicing edge surface along a dicing path used to fabricate the slider, wherein the means for altering stress is sufficient to alter stresses created by the dicing operation.

14. A method for controlling slider curvatures formed on an air-bearing surface of a disc drive head slider, the slider having leading and trailing surfaces, and a pair of dicing sides, the method comprising:

scribing lines in a pattern on each of said dicing sides to alter stresses created by a dicing process.

15. The method according to claim 14 wherein said pattern comprises at least one line paralleling the air-bearing surface.

16. The method of claim 15 wherein said at least one line is formed by melting slider material.

17. The method of claim 15 wherein said at least one line is formed by ablating slider material.

18. The method of claim 15 wherein said at least one line is formed by removing slider material with an ion beam.

19. The method of claim 16 wherein said melting is caused by a laser.

20. The method of claim 17 wherein said ablating is caused by a laser.

21. The method of claim 19 wherein said laser is a continuous wave laser.

22. The method of claim 19 wherein said laser is a pulsed laser.

23. The method of claim 15 wherein said lines extend the majority of the distance between the leading and trailing surfaces.

24. The method of claim 23 wherein said slider has a back surface opposite said air-bearing surface and said pattern comprises a plurality of lines scribed one at a time in an order.

25. The method of claim 24 wherein said order comprises scribing a first line near the air-bearing surface and subsequent lines nearer the back surface.

26. The method of claim 24 wherein said order comprises scribing a first line near the back surface and subsequent lines nearer the air-bearing surface.

27. The method of claim 24 wherein said order comprises scribing a first line near the mid point between the air-bearing and back surfaces and subsequent lines in a alternating pattern, first on one side, and the next on the other side, of the first line.

28. The method of claim 15 wherein at least one line extends from near either a leading or trailing surface only part way to the respective trailing or leading surfaces.

29. The method of claim 28 wherein said lines on opposite sides extend from near a leading surface on one side and a trailing surface on the other side.

* * * * *

UNITED STATES PATENT AND TRADEMARK OFFICE
CERTIFICATE OF CORRECTION

PATENT NO. : 6,531,084 B1
DATED : March 11, 2003
INVENTOR(S) : Strom et al.

It is certified that error appears in the above-identified patent and that said Letters Patent is hereby corrected as shown below:

<u>Title page,</u>
Item [60], Related U.S. Application Data, please add -- Provisional application No. 60/168,791, filed on Dec. 2, 1999. --

<u>Column 1,</u>
Line 2, before the paragraph "BACKGROUND" please add -- The application claims the benefit of U.S. Provisional Patent Application Ser. No. 60/168,791, filed Dec. 2, 1999. This application is incorporated herein by reference. --

Signed and Sealed this

Sixteenth Day of December, 2003

JAMES E. ROGAN
*Director of the United States Patent and Trademark Office*